United States Patent
Barret et al.

(10) Patent No.: US 7,340,575 B2
(45) Date of Patent: Mar. 4, 2008

(54) METHOD AND A CIRCUIT FOR CONTROLLING ACCESS TO THE CONTENT OF A MEMORY INTEGRATED WITH A MICROPROCESSOR

(75) Inventors: Gauthier Barret, Lancey (FR); Jean-Francois Pollet, Jarrie (FR)

(73) Assignee: Cabinet Michel de Beaumont, Grenoble (FR)

(*) Notice: Subject to any disclaimer, the term of this patent is extended or adjusted under 35 U.S.C. 154(b) by 301 days.

(21) Appl. No.: 10/000,143

(22) Filed: Oct. 23, 2001

(65) Prior Publication Data

US 2002/0083283 A1 Jun. 27, 2002

(30) Foreign Application Priority Data

Oct. 25, 2000 (FR) .................................. 00 13684

(51) Int. Cl.
*G06F 13/00* (2006.01)
(52) U.S. Cl. ........................................ 711/164; 711/163
(58) Field of Classification Search ................ 711/163, 711/164
See application file for complete search history.

(56) References Cited

U.S. PATENT DOCUMENTS

| | | | |
|---|---|---|---|
| 4,584,665 A * | 4/1986 | Vrielink ........................ 714/51 |
| 5,559,992 A * | 9/1996 | Stutz et al. .................. 711/163 |
| 5,687,379 A | 11/1997 | Smith et al. ................. 395/726 |
| 5,867,655 A * | 2/1999 | DeRoo et al. ............... 709/213 |
| 6,219,771 B1 * | 4/2001 | Kikuchi et al. .............. 711/164 |
| 6,289,455 B1 * | 9/2001 | Kocher et al. ............... 713/194 |
| 2002/0186842 A1 * | 12/2002 | Sabet-Sharghi et al. .... 380/200 |
| 2003/0194094 A1 * | 10/2003 | Lampson et al. ........... 380/282 |

FOREIGN PATENT DOCUMENTS

WO   WO93 06542   4/1993

* cited by examiner

*Primary Examiner*—Reba I. Elmore
(74) *Attorney, Agent, or Firm*—Duane Morris, LLP

(57) ABSTRACT

A method and a circuit for controlling the access to all or part of the content of a memory that is integrated with a microprocessor, a priority-holding interrupt, at least one register of keys, and at least one access control algorithm contained in a second auxiliary memory are used. The content of at least one also integrated storage element and the content of the key register, the content of the auxiliary memory being programmable only once.

10 Claims, 3 Drawing Sheets

METHOD AND A CIRCUIT FOR CONTROLLING ACCESS TO THE CONTENT OF A MEMORY INTEGRATED WITH A MICROPROCESSOR

This application claims priority rights under 35 U.S.C. §119 from French application 00/13684, filed on Oct. 25, 2000, the entire disclosure of which is hereby incorporated by reference.

BACKGROUND OF THE INVENTION

1. Field of the Invention

The present invention relates to the field of microcontrollers or microprocessors embarked (integrated) with other functions in a same circuit. These other functions typically are memories, specific peripherals or other microprocessors. For example, the design of new circuits more and more often uses reusable microprocessor cores, generally called "virtual components". This technique enables, for a given application, designing a circuit perfectly adapted to the needs, while taking advantage of an already known and tested microprocessor core. The miniaturization of integrated circuits is thus taken advantage of, not only for associating the microprocessor with other processing circuits linked to the application, but also for miniaturizing the processor itself.

The present invention relates to the protection of the programs and/or data contained in an integrated circuit integrating a microprocessor and one or several memories. More generally, it is desired to control the access to memories of which the signals transiting on physical links (buses) of exchange with the microprocessor are not directly measurable by an electronic device.

2. Discussion of the Related Art

It is indeed desirable to protect the application programs of the integrated circuit as well as some data. For the programs, this protection is intended, in particular, to avoid piracy of the programs designed by a given designer and avoid an incidental disappearing of the programs.

A current solution consists of using fuse-type means to definitively block the access to some memories of the integrated circuit. However, a disadvantage is that these memories are then no longer accessible, even by an authorized designer, in the context of servicing operations.

Another known solution is to give an access code to be provided to the integrated circuit to authorize access to one of its memories. A disadvantage of this solution is that it is enough to know this access code to get round the protection.

SUMMARY OF THE INVENTION

The present invention more specifically aims at providing an access control method which does not definitively block the access to protected memories. The present invention also aims at providing a solution which enables the integrated circuit manufacturer and/or the application program designer to individualize the access controls to the different memories. The present invention also aims at providing a solution in which it is not sufficient to have an access code or key to have access to protected memories.

According to an aspect of the invention, a method for controlling the access to all or part of the content of a first memory integrated with a microprocessor is described. The method involves executing an access control algorithm contained in a second auxiliary memory using a priority-holding interrupt (PRIORIN), then, accessing the content of the first memory with the access control algorithm using at least one register of keys. In this method, the second auxiliary memory is distinct from the first memory and the content of the auxiliary memory is programmable only once.

At least one sub-program enabling authorizing the execution of a function of accessing the first memory may be contained in the auxiliary memory. The PRIORIN is non-interruptible, even by itself. The PRIORIN is generated provided that a signal indicative of an access control operating mode is in an active state. The PRIORIN can be generated upon occurrence of an interrupt request coming from the outside of the integrated circuit or from the inside. The first memory may be a program memory containing embarked functions. The storage element may be formed by the program memory.

According to another aspect of the invention, a circuit integrating a microprocessor and at least one first memory is disclosed. The circuit includes a second auxiliary memory adapted to contain at least one sub-program for authorizing the execution of a function of accessing the first memory. The auxiliary memory is programmable only once.

The circuit further includes means for selecting, at the input of a memory interface of the microprocessor, a memory from among at least the auxiliary memory, and the first memory. The selection of the first memory, otherwise than for the execution of a function that it contains, requiring an authorization from an algorithm contained in the auxiliary memory and using the content of at least one integrated storage element and the content of the key register. The first memory and the storage element maybe one and the same program memory.

According to another aspect of the invention, the circuit further includes means for generating a PRIORIN for executing the sub-program. The PRIORIN being generated, provided that a signal indicative of an access-control operating mode is in an active state, an access to the first memory has been requested otherwise than for a non-interruptible execution of one of the functions that it contains, and an interrupt signal is active, the resulting PRIORIN being non-interruptible, even by itself.

The foregoing objects, features and advantages of the present invention will be discussed in detail in the following non-limiting description of specific embodiments in connection with the accompanying drawings.

DETAILED DESCRIPTION

Figure 1:
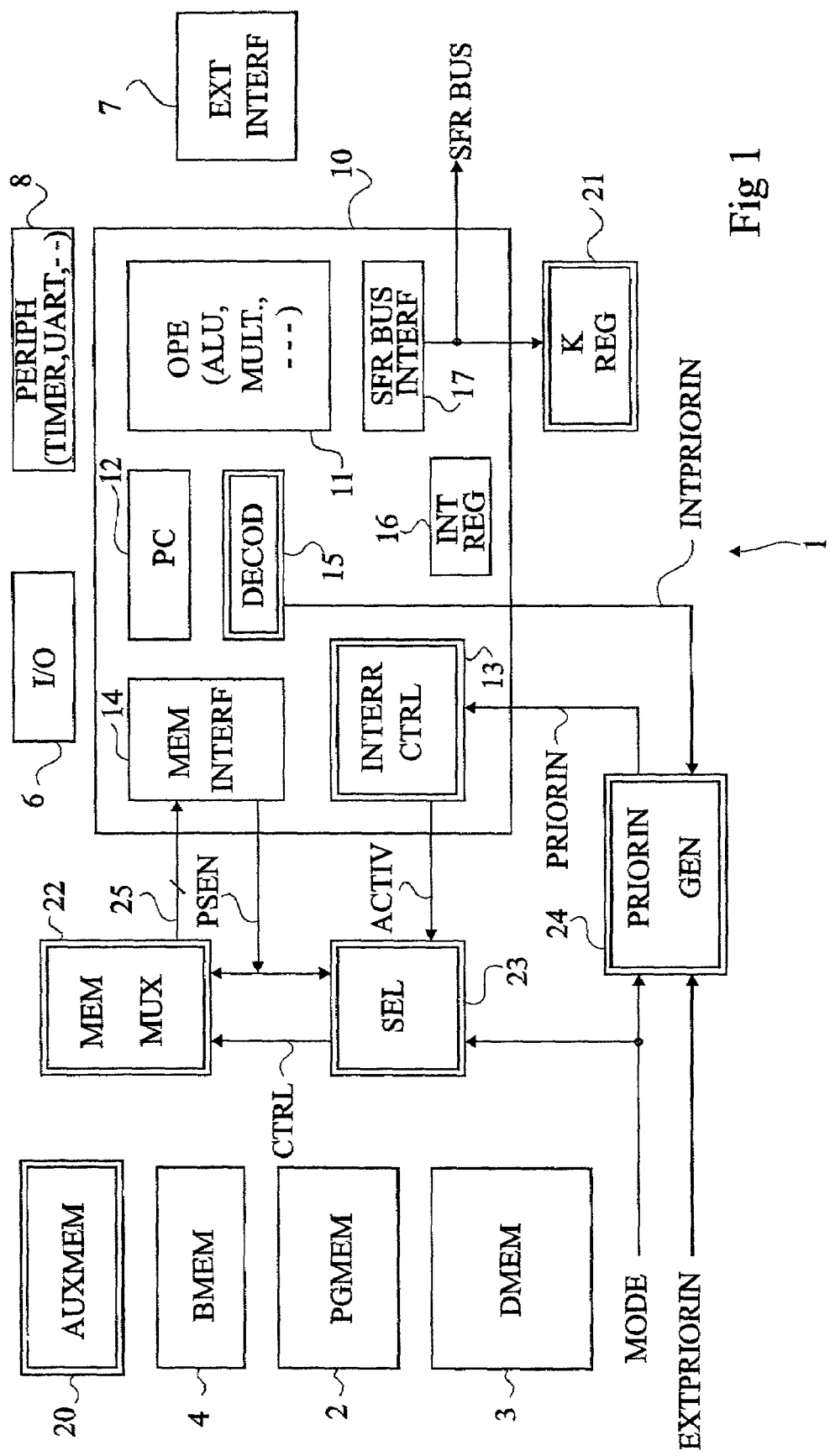
FIG. 1 schematically shows in the form of blocks the architecture of a circuit integrating a microprocessor according to the present invention.

Same elements have been designated with the same references in the different drawings. For clarity, only those elements of a circuit integrating a microprocessor as well as those method steps which are useful to the understanding of the present invention have been shown in the drawings and will be described hereafter. In particular, the structures and the operation of an interrupt controller are within the abilities of those skilled in the art and are no object of the present invention.

FIG. 1 schematically shows an embodiment of a circuit 1 integrating a microcontroller or microprocessor and various peripherals. These peripherals may be integrated indifferently in the same circuit or in another circuit of the application. Among those are a program memory 2 (PGEM) containing the embarked programs of the application, a RAM 3 (DMEM) intended to contain the data, and a starting memory 4 (BMEM) containing the instructions necessary to initialize the integrated circuit.

The actual microprocessor components are gathered within a block 10 shown in FIG. 1. The microprocessor components include an operator block 11 (OPE); a program counter 12 (PC); an interrupt controller 13 (INTERR CTRL); a memory interface 14 (MEM INTERF) through which transit the read and/or write addresses in memories 2, 3, and 4 and the data from and towards these memories as well as the read and write control signals; an instruction decoder 15 (DECOD); one or several internal registers 16 (INTREG); and a circuit 17 (SFR BUS INTERF) of interface with a bus (SFR BUS) intended to enable communication between microprocessor 10 and user registers integrated in circuit 1. The operator block 11 (OPE) may include, among other things, an arithmetic and logic unit (ALU), multipliers (MULT), etc.

Circuit 1 may also integrate input/output ports 6 (I/O) which individually communicate with the outside of circuit 1. The circuit 1 may further include an external interface 7 (EXT INTERF) and standard peripherals 8 (PERIPH), for example, a serial port (UART), one or several timers (TIMER), etc.

According to an embodiment of the present invention, circuit 1 may also include an auxiliary memory 20 (AUX MEM) intended to contain sub-programs enabling the authorization (by means of algorithms) of the execution of a function to access the content of a memory to be protected and executing this function; one or several registers 21 (K REG) intended to contain access keys used by the algorithms of the auxiliary memory, these registers 21 communicating, for example, with circuit 17; a memory multiplexing circuit 22 (MEM MUX); a selector 23 (SEL) of the memory to be used; and a generator 24 of a priority-holding interrupt (PRIORIN GEN).

In the sense of the present invention, a function of access to the content of a memory designates an access other than that implemented by the microprocessor in the course of the application program. This may be, for example, a reading for display of a program, a writing of a program, a testing of a program (for example, a step-by-step execution), a modification of a program, the erasing of a program, a reading of data, etc.

A feature of the present invention is that the auxiliary memory is programmed only once. It is, for example, a ROM, an OTP-type memory, a fuse-protected memory, etc.

According to the present invention, the memory of which the content is desired to be protected is integrated with the microprocessor or, at least, its connections with the microprocessor are not directly measurable by an electronic device once the circuit has been made. To simplify the present description, reference will be made hereafter to memories integrated with circuit 1 to designate memories of which the connections with the microprocessor are not measurable.

The present invention will be described hereafter in relation with an example of control of the access to a portion of program memory 2. However, unless otherwise specified, all that will be described also applies to a control of the access to all or part of a memory containing data (memory 3 or user registers).

According to another embodiment of the invention, interrupt generator 24 receives the following signals from decoder 15: an external interrupt signal EXTPRIORIN; a signal MODE, set by the user or the designer, and indicative of the desired operating mode between a normal exploitation mode of the integrated circuit and a mode of protected access to program memory 2; and an internal interrupt signal INTPRIORIN.

Generator 24 provides an interrupt signal (PRIORIN) to controller 13. Interrupt PRIORIN corresponds to the highest priority rank. Interrupt controller 13 provides an activation signal ACTIV to selector 23, which also receive signal MODE. Circuit 23 further includes a signal PSEN coming from memory interface 14 of microprocessor 10. Signal PSEN indicates to selection circuit 23 that the memory interface communicates with one of memories 2, 4, or 20.

Selection circuit 23 controls memory multiplexer 22, the function of which is to select one of memories 2, 3, 4 or 20 for communication with interface 14, and thus with the microprocessor. Multiplexer 22 receives a control signal CTRL from circuit 23 as well as signal PSEN of memory interface 14. Any transfer between one of memories 2, 3, 4, or 20 and memory interface 14 of the microprocessor transits through memory multiplexer 22, which communicates with microprocessor 10 via a bus 25. The function fulfilled by memory multiplexer 22 will be better understood hereafter in relation with FIG. 3.

Other signals of course transit between the different blocks of circuit 1. These have not been shown since they are no object of the present invention and are either conventional, or within the abilities of those skilled in the art based on the functional indications of the present description.

The distribution of memories 2, 3, 4, and 20 illustrated by FIG. 1 is functional. In practice, some of these memories (for example, auxiliary memory 20 and starting memory 4) may correspond to areas of a same memory, provided that their specific functions are respected.

The execution of a sub-program of auxiliary memory 20 is caused by specific interrupt PRIORIN. This interrupt has the feature of being non-interruptible, even by itself. In other words, the end of the execution of the instructions of the program on which the branching has been made due to the occurrence of this priority-holding interrupt must be awaited before a new interrupt of the same type can be executed. According to the present invention, this interrupt can have two origins. A first origin is an origin external to the integrated circuit by means of a dedicated terminal thereof (signal EXTPRIORIN). A second origin is internal or software-supported and is generated by the microprocessor itself (for example, the step-by-step operation of a program) or by a peripheral (signal INTPRIORIN).

To select the auxiliary memory, not only must the priority-holding interrupt be activated, but also must the user have programmed signal MODE. In the discussed embodiment, an access to the data memory must further not be ongoing for selector 23 to be likely to select auxiliary memory 20 with multiplexer 22. The condition of access to the data memory is not compulsory. It depends on the microprocessor used.

The access control algorithm(s) take account of the keys contained in register(s) 21 and of words contained elsewhere in at least one storage element of the integrated circuit, for example, in program memory 2. The algorithm(s) are contained in the auxiliary memory, and thus inaccessible after a first programming. For example, an algorithm may consists in an XOR-type function between the word(s) of a key register and words located at predefined addressed of the program memory (for example, the first n words of the program to which access is requested). A bit-by-bit comparison with constants or any other key validation method may also be provided.

An authorized designer knows at least some of the algorithms, especially those which are necessary to write the application programs while taking into account the information necessary to the access control algorithm.

To each function of access to the memory content, a different algorithm using keys which can themselves be different may be associated.

Figure 2:
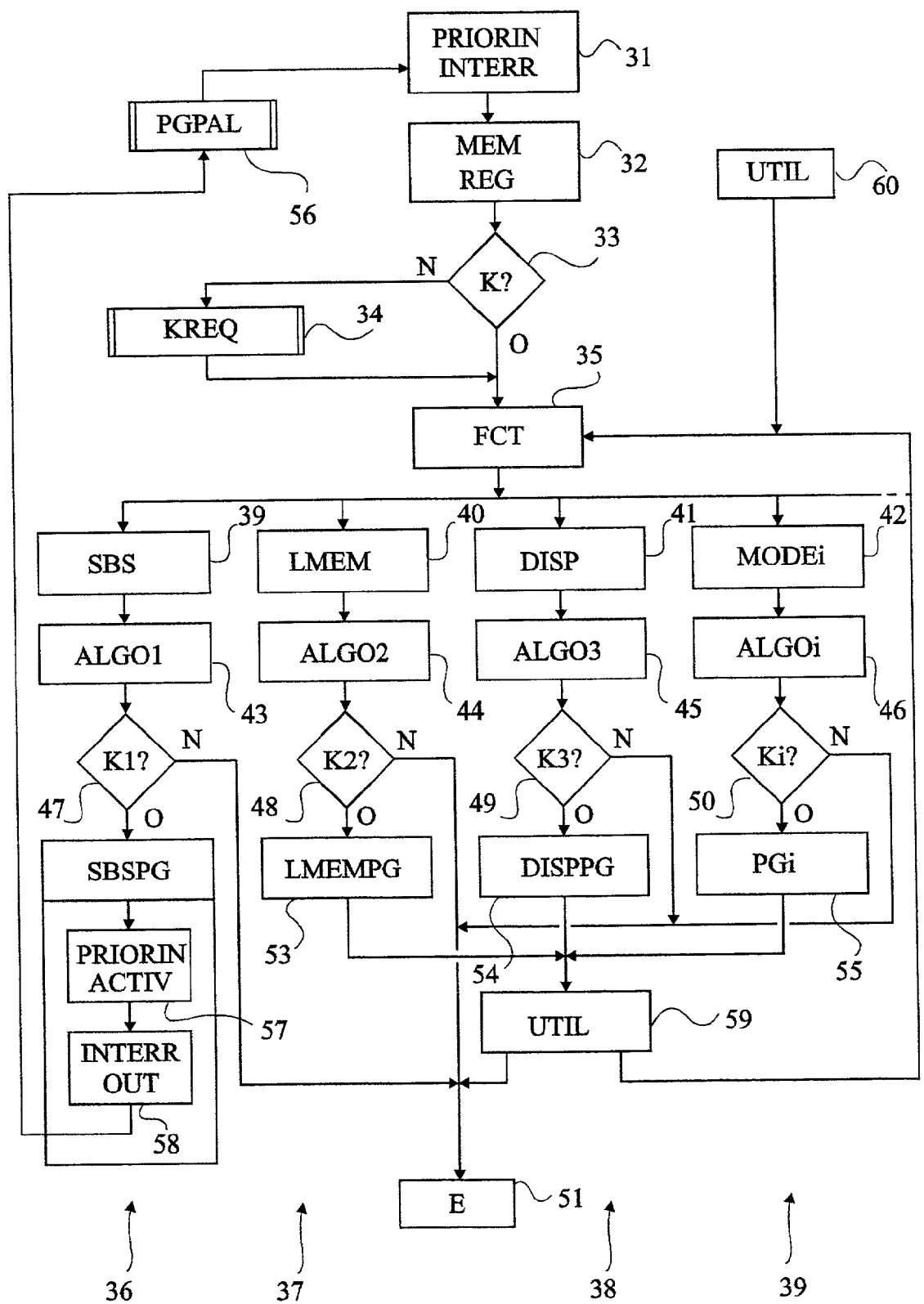
FIG. 2 is a simplified flowchart of an embodiment of an access control method according to the present invention.

FIG. 2 shows, in the form of a simplified flowchart, an example of a sub-program of the auxiliary memory according to the present invention. This sub-program is used to execute functions of access to the program memory. It is assumed that an adequate switching of signal MODE has caused the switching of the integrated circuit to the access control mode and that a PRIORIN interrupt is generated (block 31, PRIORIN INTERR) by circuit 24. Upon occurrence of interrupt PRIORIN in controller 13, said controller activates selector 23 which, since signal MODE is in the appropriate state, selects the switching of memory interface 14 with auxiliary memory 20. The executed instructions then are instructions contained in auxiliary memory 20.

It is started (block 32, MEM REG) by saving the contents of the essential registers 16 of the integrated circuit. Then (block 33), it is checked whether key registers 21 have already been written into by hardware tools and/or external software. Indeed, the execution of the sub-program of the auxiliary memory may occur while these registers already have been filled, in which case a reintroduction is not necessary. Accordingly, test 33 leads, in the case where keys 21 have not been introduced, to a sub-program (block 34, KREQ) for writing into the key register. At the end of this sub-program, the branching corresponding to an affirmative response of test 33 on instructions (block 35, FCP) for waiting for and identifying the function requested by the designer is provided. The input into block 35 is performed, for example, via a block 60 (UTIL) illustrating a capture, by the user or the designer, of the chosen function.

The program continues on branches 36, 37, 38, or 39 according to the requested function. In the example of FIG. 2, branch 36 corresponds to a request for step-by-step execution of a program contained in memory 2. Branch 37 corresponds to a request for writing into program memory 2, for example, a program loading into a flash memory constitutive of this program memory. Branch 38 corresponds to a read request for display of the program memory. Branch 39 illustrates another function. Indeed, the access control of the present invention can be implemented for any processing function requiring access to the program memory.

Each branch 36, 37, 38, 39 starts with an instruction for branching to the area of the auxiliary memory containing the corresponding sub-program. These branching instructions are illustrated in FIG. 2 by respective blocks 39 (SPS), 40 (LMEM), 41 (DISP), and 42 (MODEi). The corresponding sub-programs execute access control algorithms (block 43-ALGO1, 44-ALGO2, 45-ALCO3, 46-ALGOi).

The algorithms have been illustrated in FIG. 2 as being specific to each function. However, some functions (for example, the flash memory loading and memory content display function) may resort to the same algorithms. This is the manufacturer and/or the designer—s choice, but it must be defined upon programming of the auxiliary memory.

The algorithms each provide a result indicating the coherence between the key (for example, key K1, K2, K3, Ki dedicated to the function) of registers 21 with respect to information contained, preferably, in the program memory. The coherence tests (block 47, 48, 49, 50) lead, in the negative case, to a branching on the end (block 51, E) of the access control program. If the result of the test is correct, the program branches on the sub-program (block 52-SBFPG, block 53-LMEMPG, block 54-DISPPG, block 55-PGi) corresponding to the now authorized function.

In FIG. 2, only the sub-program of step-by-step operation of a program stored in memory 2 has been slightly detailed. Such a sub-program indeed requires, according to the present invention, automatic generation of priority-holding interrupt PRIORIN. For each step-by-step instruction of the tested program, a new software interrupt PRIORIN is activated (block 57, PRIORIN ACTIV). This activation of interrupt PRIORIN then occurs while the interrupt already is being executed. However, since it is not interruptible by itself, an interrupt exit instruction (block 58, INTERR OUT) is executed. The execution of this instruction enables connecting program memory 2 containing the tested program (block 56, PGPAL) to the instruction input of the microprocessor (by multiplexer 22). The program is then executed. However, a single instruction can be executed because interrupt PRIORIN is activated again. The interrupted mode is thus entered again with the connection of the authorization memory to the instruction input of the microprocessor. The looping of this operating mode (block 31) is then performed until the end of the program to be tested.

When the execution of one of specific functions 40, 41, or 42 by means of the auxiliary memory is over, it can be returned to the main program by branching on the end of the access control program (block 51, E) or, as illustrated at the output of blocks 53, 54, 55, the program of the auxiliary memory can be set back to a state of waiting for a user order (block 59, UTIL). According to the order, it is branched on the end of the access control program or on the waiting for a function (block 35).

According to the present invention, the access control mechanisms require:

that the programmer of the auxiliary memory (the integrated circuit manufacturer or the designer) knows all the algorithms and all the functions to be contained in the auxiliary memory. He can thus program it in a non-modifiable way. The contents of the data memory and program need not be known by the programmer. If necessary, said programmer programs part of the starting memory.

an authorized designer must know the algorithms and the functions contained in the auxiliary memory. It may not be necessary for him to know all functions. Only those which are necessary to develop the program and operate the integrated circuit may be communicated to him. For example, some specific functions (for example, a function used only for the circuit testing for the manufacturer) may only be known by the initial programmer of the auxiliary memory. The authorized designer has access to the program memory, to the key register as well as to the data memory and to the starting memory. The designer does not have access to the auxiliary memory which can only be read to execute the access control, except if the designer also is the programmer of this auxiliary memory.

a pirate designer may write keys in the corresponding registers. However, if he does not know the algorithms contained in the auxiliary memory, or if he does not known the words located at the predefined addresses of the program memory, the probability for him to write the right keys is low. Accordingly, the access control program (FIG. 2) will not pass tests 47 to 50 and will prevent the access to the program memory.

if the access control applies to a portion of the data memory, the algorithms use, for example, words of the program memory to combine them with the keys.

Figure 3:
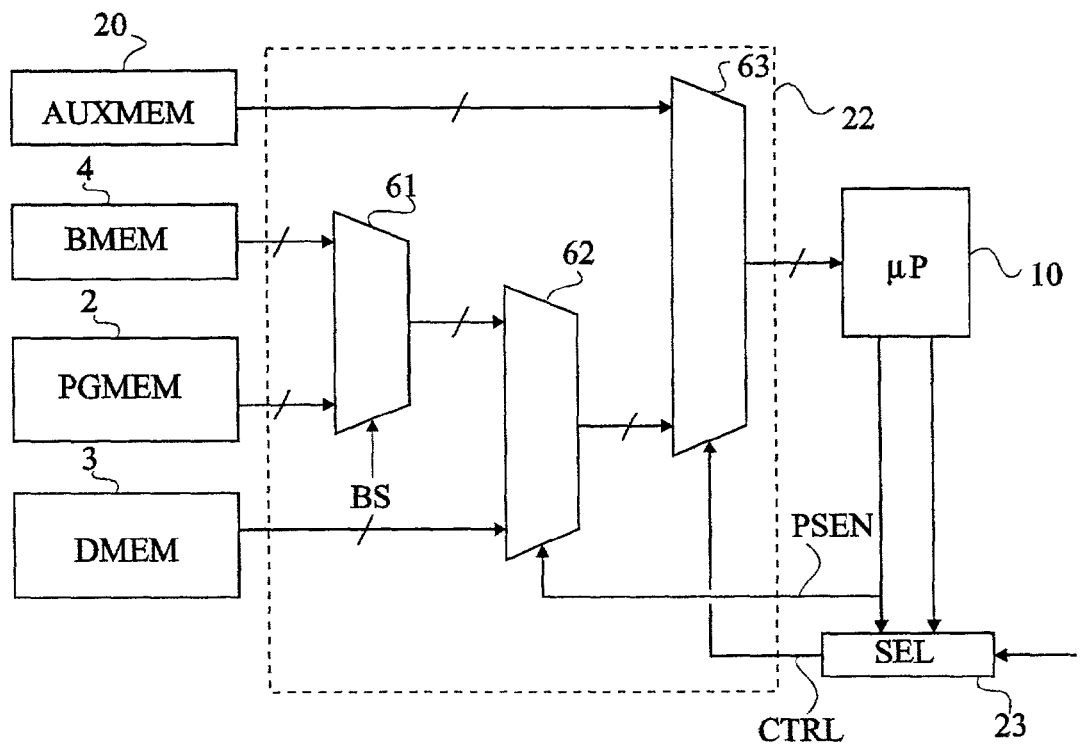
FIG. 3 schematically illustrates in the form of blocks the function implemented by a memory multiplexer of a circuit according to the present invention.

FIG. 3 shows, in a functional diagram, an embodiment of a memory multiplexer 22 according to the present invention. This multiplexer has the function of selecting one of the memories from among auxiliary memory 20, starting memory 4, program memory 2, and data memory 3, to have access to microprocessor 10. Multiplexer block 22 receives, as control signals, a signal indicative of the starting BS for the triggering of starting memory 4, a signal CTRL provided by selector block 23, and signal PSEN provided by the memory interface (14, FIG. 1) of the microprocessor. In FIG. 3, the selection is illustrated by three multiplexers. A first multiplexer 61 selects, under control of signal BS, one of the memories between starting memory 4 and program memory 2. The output of multiplexer 61 is sent onto an input of a multiplexer 62, having a second input connected to data memory 3. Multiplexer 62 selects, under control of signal PSEN, the data memory or a program memory. Its output is connected to the input of a multiplexer 63 having a second input which receives auxiliary memory 20. Multiplexer 63 is controlled by signal CTRL coming from selector 23.

Of course, circuit 23 is to be adapted to the number of memories associated with the integrated circuit.

Figure 4:
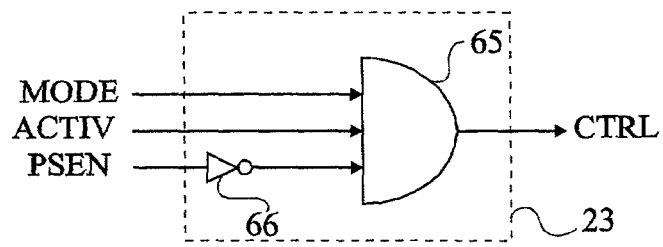
FIG. 4 shows an embodiment of a selection circuit according to the present invention.

FIG. 4 shows an embodiment of a selector 23 according to the present invention. According to this simplified embodiment, this selector is based on a logic three-input AND-type gate 65. A first input receives signal MODE. A second input receives signal ACTIV provided by interrupt controller 13, indicative of an active priority-holding interrupt PRIORIN. A third input receives signal PSEN having crossed an inverter 66. Selector 23 provides signal CTRL. of selection of the auxiliary memory. This selection is effective provided that the programming mode is selected, that a priority-holding interrupt PRIORIN is active and that there is no ongoing access to the data memory. In the example of FIG. 4, signal MODE is assumed to be high when the programming mode is requested. Signal PSEN is, in this example, high when an access to the data memory is ongoing. Signal ACTIV is active in the high state.

Figure 5:
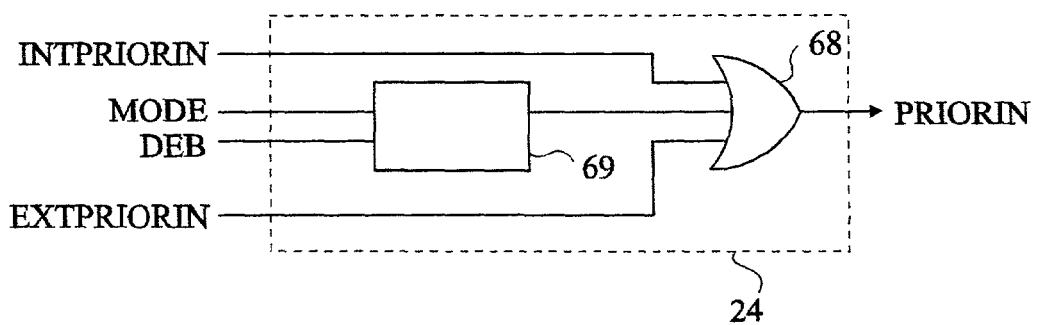
FIG. 5 shows in a simplified manner an embodiment of a priority-holding interrupt generator according to the present invention.

FIG. 5 shows an embodiment of a generator 24 of interrupt PRIORIN. Generator 24 is, for example, formed of a three-input OR-type gate 68. A first input of gate 68 receives signal INTPRIORIN provided by decoder 15. A second input of gate 68 is connected to the output of an activation circuit 69 receiving as an input signal MODE and a signal DEB indicative of the beginning of the controlled access mode. A third input of gate 63 receives signal EXTPRIORIN coming from the outside of the integrated circuit.

The function of circuit 24 is to provide priority-holding interrupt PRIORIN as soon as it appears on one of its input signals. This interrupt can thus be triggered by the external terminal of the integrated circuit (signal EXPRIORIN), it can be internally generated (signal INTPRIORIN), or it can be triggered by circuit 69. Circuit 69 provides an output in the active state (for example, the high state) upon each initialization, provided that signal MODE is in controlled access.

Other selection and generation circuits may be provided. For example, several signals EXTPRIORIN coming from the outside and/or different active states for the signals may be provided.

An advantage of the present invention is that the access control system is particularly reliable while being versatile. Indeed, an authorized designer can individualize the access control functions.

Another advantage of the present invention is to allow an authorized designer access to the content of the program memory even after the manufacturing when the circuit is under use. Such an operation is not possible with conventional fuse-protected circuits.

The implementation of the present invention has a particular interest for the loading and the servicing of programs and data in a circuit integrating a microprocessor. These operations can be performed remotely (remote loading, remote servicing), the reliability of the access control depriving of any risk the connection of the circuit to a shared network with a non-controlled access.

In practice, the communication between the circuit and the outside is performed conventionally via interface 7 (FIG. 1).

The memories may be of any type except for the auxiliary memory, the content of which must be programmable only once, be it upon manufacturing or subsequently.

Structurally, an integrated circuit according to the present invention characterizes by the presence of an auxiliary or authorization memory, containing the functions blocked after a first programming and which is distinct (at least functionally) from the memory (for example, the program memory) containing functions to which the access is desired to be protected. A circuit also includes an additional terminal to activate the priority-holding interrupt from the outside (signal EXTPRIORIN). Of course, the interrupt controller must be adapted and the selector, the generator of interrupt PRIORIN, specific key registers, and a memory multiplexer or the like must also be provided. On this regard, although certain functions have been described by certain hardware components (multiplexer, logic gates), they may be formed in another way, in software form.

Of course, the present invention is likely to have various alterations, modifications, and improvements which will readily occur to those skilled in the art. In particular, the number of functions will be adapted to the destination of the integrated circuit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling the access to all or part of the content of a memory integrated with a microprocessor, the method comprising:

executing an access control algorithm contained in an auxiliary memory using a priority-holding interrupt (PRIORIN); and accessing the content of the memory with the access control algorithm using at least one register of keys, wherein the auxiliary memory is at least functionally distinct from the memory in that the memory is for containing embarked programs of a desired application and the auxiliary memory is not for containing the embarked programs of the desired application, and the content of the auxiliary memory being programmable only once.

2. The method of claim 1, wherein at least one sub-program authorizing the execution of a function of access to the memory is contained in the auxiliary memory.

3. The method of claim 1, wherein the priority-holding interrupt (PRIORIN) is non-interruptible, even by itself.

4. The method of claim 1, wherein said priority-holding interrupt (PRIORIN) is generated provided that a signal (MODE) indicative of an access control operating mode is in an active state.

5. The method of claim 1, wherein said priority-holding interrupt (PRIORIN) can be generated upon occurrence of an interrupt request coming from the outside (EXTPRIORIN) of the integrated circuit or from the inside (INTPRIORIN).

6. The method of claim 1, wherein the accessing step includes using the content of at least one integrated storage element along with the content of the key register.

7. A circuit comprising:
 a microprocessor integrated with at least one memory;
 an auxiliary memory containing at least one sub-program for accessing the content of the memory, wherein said auxiliary memory is at least functionally distinct from the memory in that the memory is for containing embarked programs of a desired application and the auxiliary memory is not for containing the embarked programs of the desired application, and the content of the auxiliary memory being programmable only once.

8. The circuit of claim 7, further including means for selecting, at an input of a memory interface of the microprocessor, a memory from among at least said auxiliary memory and said memory, wherein
 the selection of said memory, otherwise that for the execution of one of the programs that it contains, requiring an authorization from an algorithm contained in the auxiliary memory and using the content of at least one integrated storage element and the content of a key register.

9. The circuit of claim 8, wherein the memory and the storage element are one and the same program memory.

10. The circuit of claim 7, further including means for generating a priority-holding interrupt for executing said sub-program, provided that:
 a signal (MODE) indicative of an access-control operating mode is in an active state;
 an access to the memory has been requested otherwise than for a non-interruptible execution of one of the programs that it contains; and
 an interrupt signal (EXTPRIORIN, INTPRIORIN) is active, wherein the resulting priority-holding interrupt being non-interruptible.

* * * * *